(12) United States Patent
Meabon

(10) Patent No.: US 6,419,244 B2
(45) Date of Patent: Jul. 16, 2002

(54) CONVERTIBLE HAND DOLLY AND CART

(76) Inventor: Fred E. Meabon, 1601 W. MacArthur Blvd. (Apartment 30M), Santa Ana, CA (US) 92714

( * ) Notice: Subject to any disclaimer, the term of this patent is extended or adjusted under 35 U.S.C. 154(b) by 0 days.

(21) Appl. No.: 09/817,861

(22) Filed: Mar. 26, 2001

Related U.S. Application Data

(63) Continuation of application No. 09/138,593, filed on Aug. 22, 1998.
(60) Provisional application No. 60/058,918, filed on Aug. 23, 1997.

(51) Int. Cl.$^7$ ................................................. B62B 1/00
(52) U.S. Cl. ............................... 280/47.27; 280/47.17; 280/654
(58) Field of Search .............................. 280/638, 639, 280/651, 652, 654, 47.17, 47.18, 47.24, 47.27, 47.28, 47.34, 47.35, 47.371, 47.2, 62; D34/12, 17, 26

(56) References Cited

U.S. PATENT DOCUMENTS

| | | | |
|---|---|---|---|
| 1,024,469 A | * 4/1912 | Ballinger | 280/47.2 |
| 1,481,002 A | * 1/1924 | Ferris | 280/62 |
| 2,472,989 A | 6/1949 | Skipper et al. | 280/651 |
| 2,564,248 A | 8/1951 | Chenette | 280/47.17 |
| 2,818,988 A | * 1/1958 | Dunkin | 414/457 |
| 3,043,603 A | 7/1962 | Major | 280/47.17 |
| 3,193,123 A | 7/1965 | Wouden | 280/47.27 |
| 3,337,228 A | 8/1967 | Shulkin | 280/639 |
| 3,743,312 A | * 7/1973 | Gibbons | 280/47.18 |
| 3,785,669 A | 1/1974 | Doheny | 280/47.18 |
| 3,850,441 A | 11/1974 | Peters et al. | 280/47.2 |
| 3,873,118 A | * 3/1975 | Takagi | 280/47.2 |
| 4,009,891 A | * 3/1977 | Jensen | 280/651 |
| 4,227,709 A | * 10/1980 | Gradwohl et al. | 280/47.11 |
| 4,241,930 A | * 12/1980 | Bell et al. | 280/47.29 |
| 4,286,800 A | * 9/1981 | Lomas | 280/414.1 |
| 4,407,521 A | 10/1983 | Zeitlin | 280/655 |
| 4,448,434 A | 5/1984 | Anderson | |
| 4,570,961 A | 2/1986 | Chateauneuf et al. | 280/47.18 |
| 4,802,681 A | * 2/1989 | Hung | 280/47.18 |
| 5,160,153 A | 11/1992 | Zan | 280/43.1 |
| 5,228,716 A | 7/1993 | Dahl | 280/651 |
| 5,244,221 A | * 9/1993 | Ward | 280/79.7 |
| 5,290,051 A | 3/1994 | Olson | 280/47.27 |
| 5,351,984 A | 10/1994 | Cheng | 280/655 |
| 5,419,569 A | * 5/1995 | Walla | 280/47.27 |
| 5,433,469 A | 7/1995 | Cassels | 280/655 |
| 5,465,987 A | 11/1995 | Della Vecchia | 280/47.28 |
| 5,489,109 A | 2/1996 | Murphy | 280/415.1 |
| 5,536,034 A | * 7/1996 | Miller | 280/651 |
| 5,645,292 A | * 7/1997 | McWilliams et al. | 280/494 |
| 6,053,515 A | * 4/2000 | Kelley | 280/47.18 |
| 6,224,071 B1 | * 5/2001 | Dummer | 280/47.2 |
| 6,260,864 B1 | * 7/2001 | Smith | 280/47.26 |

* cited by examiner

Primary Examiner—J. J. Swann
Assistant Examiner—Christopher Bottorff
(74) Attorney, Agent, or Firm—Richard E. Bee

(57) ABSTRACT

A heavy-duty all-terrain convertible hauler unit is provided which can be converted into various different configurations for hauling a wide variety of different kinds of cargo and material. This hauler unit includes an elongated chassis having first and second ends. A dolly-type load-support spade is attached to one end of the chassis and a pair of relatively large diameter rubber-tired wheels are mounted on the chassis at this same end, but on the side opposite the load-support spade. A longitudinally-extending handle member is mounted at the second end of the chassis when the hauler unit is used as an upright-type hand dolly. This handle member may instead be mounted on the load-support spade in a vertical position when the hauler unit is used as a horizontal-type cart. A third wheel is mounted in the center of the chassis at the second end of the chassis when the hauler unit is used as a horizontal-type cart. A pair of elongated panels are mounted on the chassis in different selected orientations to accommodate different kinds of cargo.

8 Claims, 11 Drawing Sheets

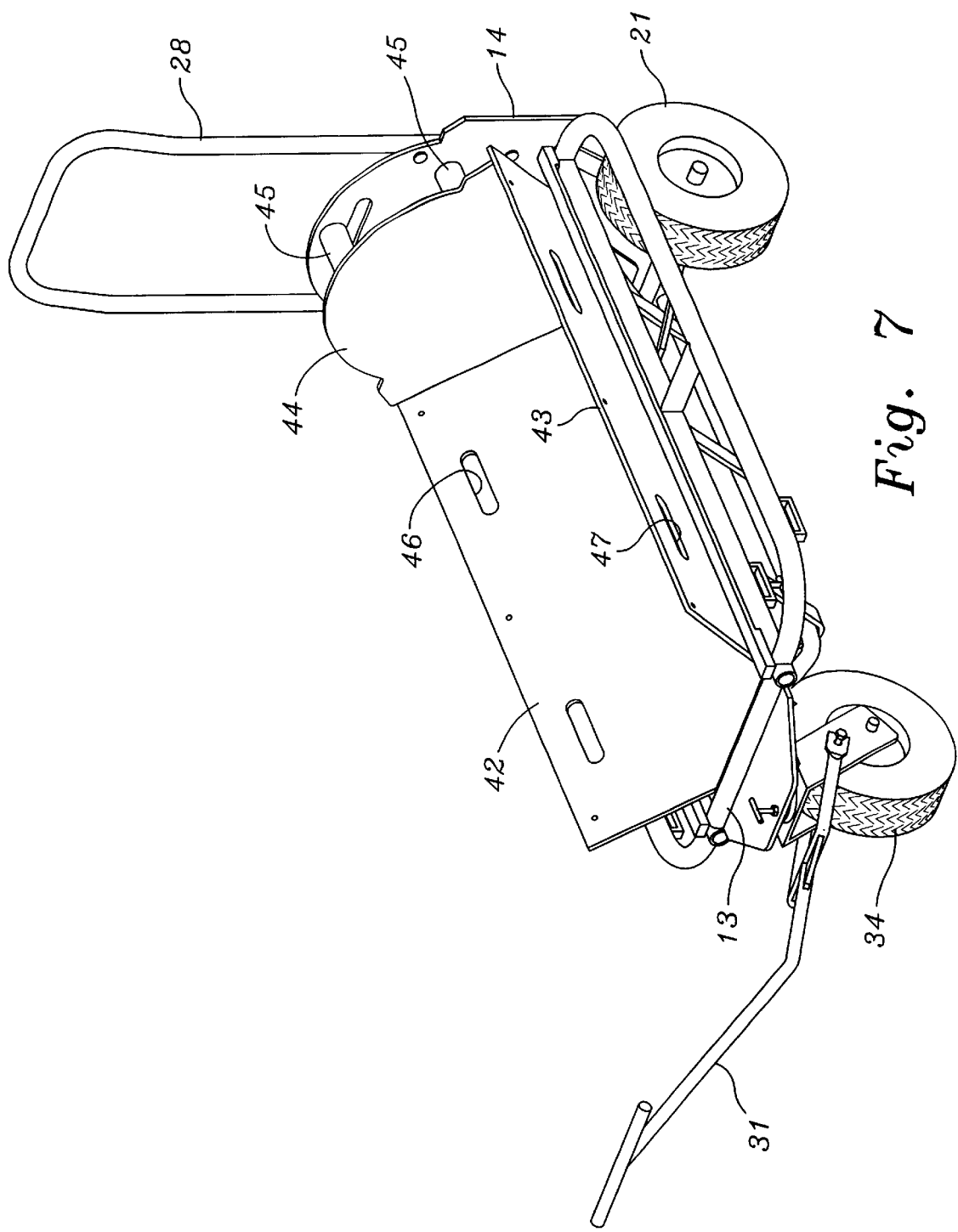

CONVERTIBLE HAND DOLLY AND CART

CROSS REFERENCE TO RELATED APPLICATIONS

The present patent application is a continuation of copending U.S. patent application Ser. No. 09/138,593, filed Aug. 22, 1998, entitled "Convertible Hand Dolly and Cart", and further claims the benefit of the filing date of U.S. Provisional Patent Application Ser. No. 60/058,918, filed Aug. 23, 1997, entitled "Versatile Dolly and Hand Truck", both preceding applications being filed in the name of the same inventor as the present patent application.

TECHNICAL FIELD

This invention relates to dollys, hand trucks, carts, wagons and other wheeled vehicles useful for moving large appliances (refrigerators, stoves, washing machines, et cetera), heavy cylindrical objects (bottled water bottles, gas cylinders, et cetera), packing boxes, crates, boxed merchandise, books, firewood and other stackable items and for hauling various types of loose materials such as soil, gravel, coal, apples, trash and what not.

BACKGROUND OF THE INVENTION

It is known to use two-wheeled hand dollys to move large objects such as refrigerators, stoves, large boxes and the like. The object is tipped forward slightly, the spade member of the dolly is placed under the object and the object is lowered onto the spade member. The object and the upright dolly frame are then tipped back so that most of the weight of the object is carried by the wheels of the dolly. The object may then be wheeled to a desired destination.

It is also known to use special hand dollys for moving relatively large and heavy cylindrical objects such as beer kegs, filled bottled water bottles, oxygen cylinders, acetylene gas cylinders, and the like. These dollys are provided with side walls set at angles to provide an angular cargo space. These side walls prevent the cylindrical object from rolling off the dolly.

Various kinds of hand trucks and carts are used in factories, warehouses, offices and sometimes homes for purposes of moving items from one location to another. These hand trucks and carts come in different sizes and shapes, depending on the nature of the commodities to be moved.

For outdoor work and yard work, it is sometimes necessary to move loose materials such as soil, gravel, trash and the like. Carts and wagons used for this purpose generally have sidewalls and closed bottoms for containing the loose material.

In order to accommodate a number of different situations, it is sometimes necessary to employ two or more different kinds of dollys, hand trucks, carts, wagons and the like. In such cases, it would be advantageous to have a single vehicle which could be easily converted from one type of use to another. In particular, it would be desirable to have one basic vehicle that can be modified to haul almost any kind of item or material.

SUMMARY OF THE INVENTION

The present invention provides a heavy-duty all-terrain convertible hauler unit which can be easily converted into an upright-type hand dolly or into a horizontal-type cart or hand truck. This hauler unit includes an elongated chassis having first and second ends and first and second sides. A dolly-type load-support spade is attached to the first end of the chassis and extends outwardly from the first side of the chassis. A pair of relatively large diameter rubber-tired wheels are mounted on the chassis near the first end of the chassis on the second side of the chassis. A handle member may be mounted at the second end of the chassis when the hauler unit is used as an upright-type hand dolly. This handle member may instead be mounted on the load-support spade in a vertical position when the hauler unit is used as a horizontal-type cart. A wheel assembly is mounted in the center of the chassis near the near the second end of the chassis on the second side of the chassis when the hauler unit is used as a horizontal-type cart. This wheel assembly comprises a third relatively large diameter rubber-tired wheel and a swivel mechanism for connecting this third wheel to the chassis in the center of the chassis near the second end thereof.

For a better understanding of the present invention, together with other and further advantages and features thereof, reference is made to the following description taken in connection with the accompanying drawings, the scope of the invention being pointed out in the appended claims.

BRIEF DESCRIPTION OF THE DRAWINGS

Referring to the drawings:

FIG. 7 is a perspective view showing the hauler unit in a modified horizontal configuration which is particularly suitable for hauling loose material such as soil, sand, gravel, and the like;

DETAILED DESCRIPTION OF THE ILLUSTRATED EMBODIMENTS

Figures 1, 2:
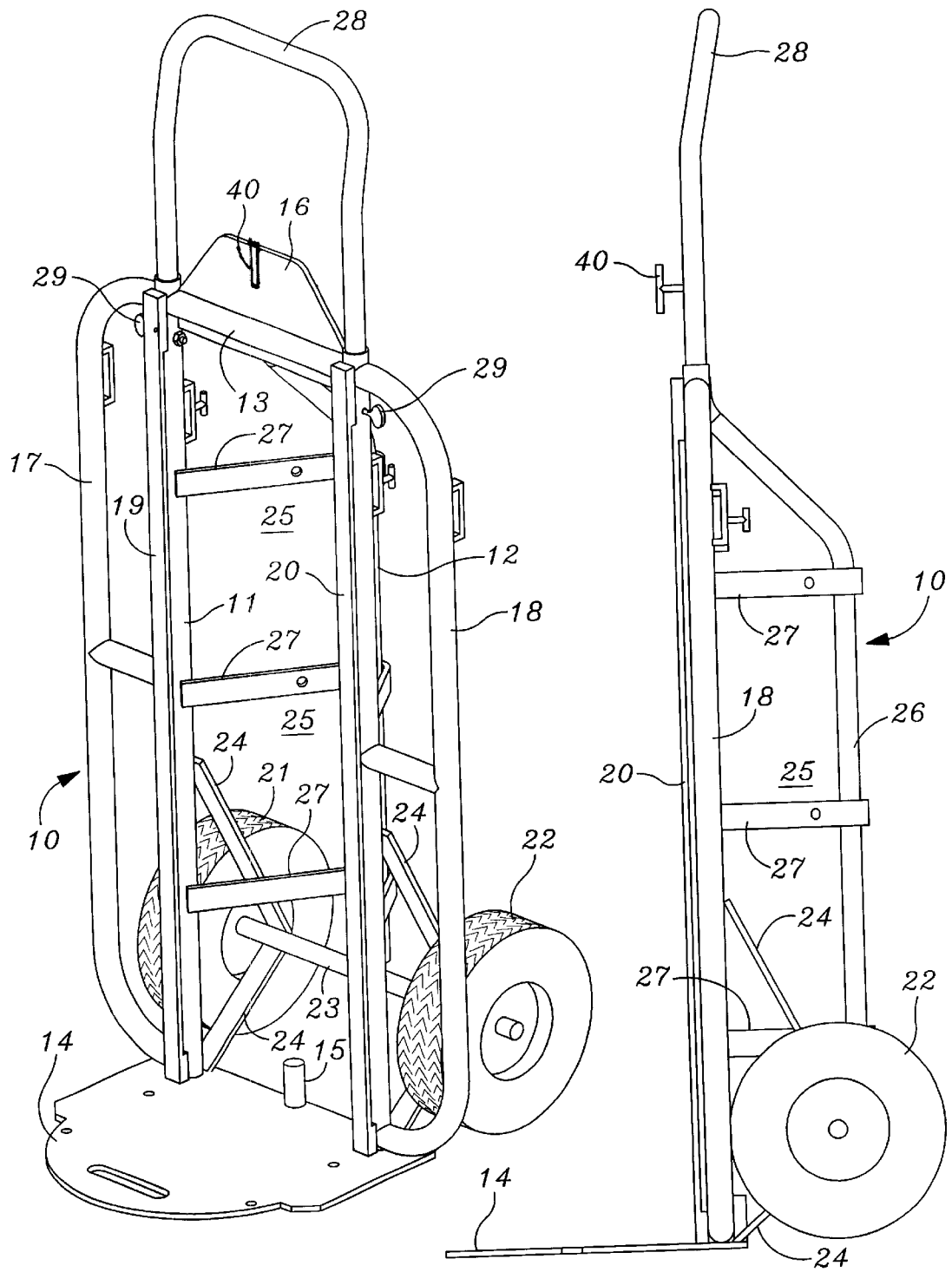
FIG. 1 is a perspective view of a representative embodiment of a convertible hauler unit constructed in accordance with the present invention and showing the hauler unit in an upright hand dolly configuration.
FIG. 2 is a side view of the FIG. 1 configuration.
Figure 3:
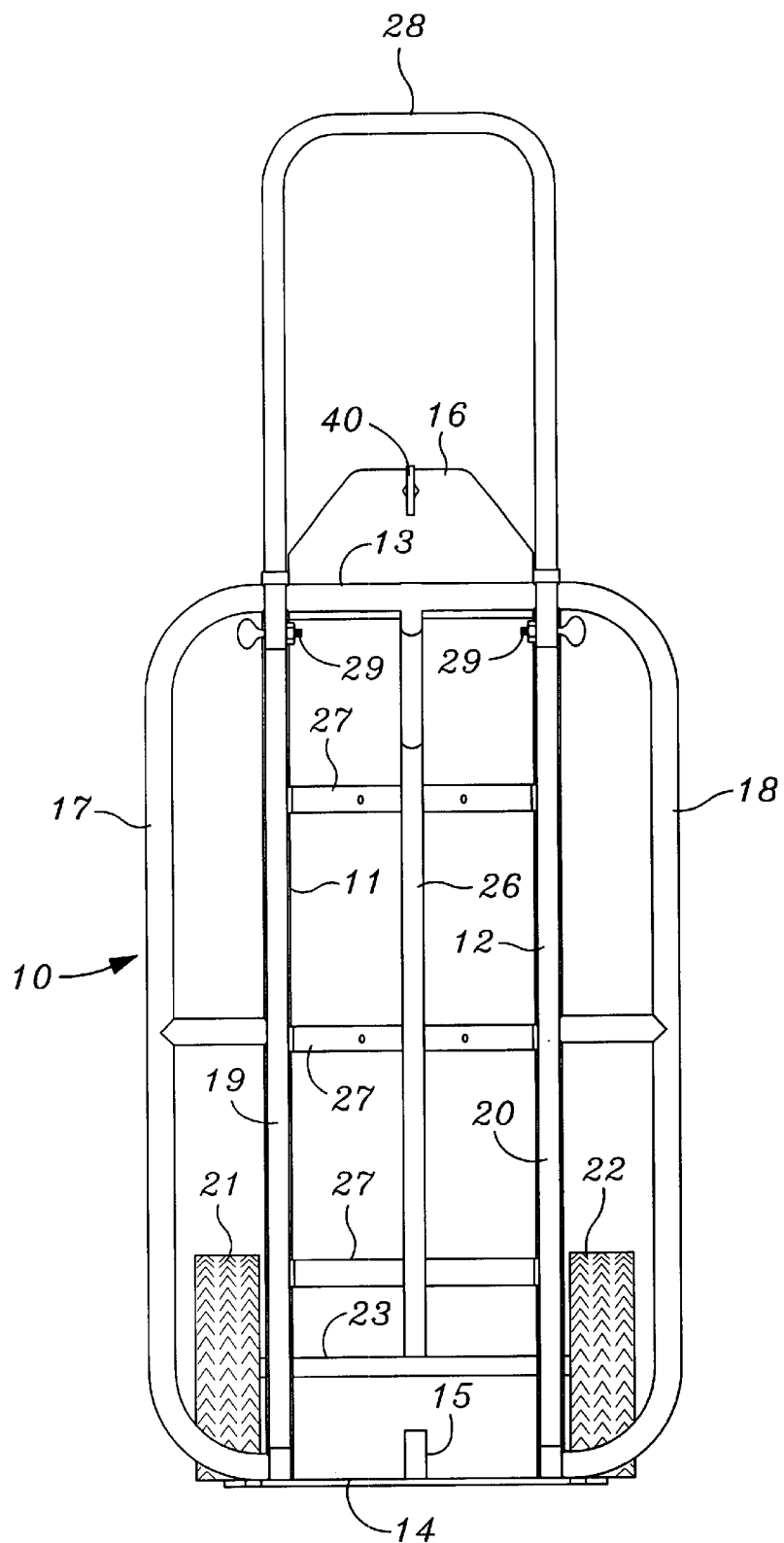
FIG. 3 is a front elevational view of the FIG. 1 configuration.

Referring to FIGS. 1, 2 and 3, there is shown a convertible hauler unit constructed in accordance with the present invention, with the hauler unit being shown in an upright hand dolly configuration. This hauler unit includes an elongated chassis 10 having first and second ends and first and second sides. These first and second sides will sometimes be referred to as front and back sides or top and bottom sides. The elongated chassis 10 includes first and second longitudinal support bars 11 and 12 and a cross member or cross bar 13 attached between the support bars 11 and 12 at one end of the chassis 10. A load-support spade in the form of a spade plate 14 is attached between the support bars 11 and 12 at the opposite end of the chassis 10. Spade plate 14 extends outwardly from a first side (front side) of the chassis 10. A short connector stub 15 is attached to the spade plate 14 near the inside edge thereof. A small support plate 16 is attached to the support bars 11 and 12 and the cross bar 13 at the cross bar 13 end of chassis 10.

The chassis 10 also includes a first longitudinal side rail 17 offset from, running along side of and attached to the first longitudinal support bar 11 and a second longitudinal side rail 18 offset from, running along side of and attached to the second longitudinal support bar 12. A first longitudinal metal strap member 19 is attached at its extremities to the load-bearing side of the first support bar 11 and a second longitudinal metal strap member 20 is attached at its extremities to the load-bearing side of the second support bar 12. Strap members 19 and 20 provide a retainer mechanism which will be referred later.

The hauling unit further includes a pair of relatively large diameter rubber-tired wheels 21 and 22 mounted near the first end (spade plate 14 end) of the chassis 10 on the second (back) side of chassis 10. More particularly, a transverse axle member 23 is attached to the chassis support bars 11 and 12 by axle support bars 24. Wheels 21 and 22 are individually mounted on opposite ends of the axle member 23. The tires on wheels 21 and 22 may be of either the solid rubber type or the inflatable pneumatic type.

The chassis 10 also includes an elongated V-shaped center channel 25 with a bottom portion 26 which is located several inches below the second (back) side of the plane of the chassis support bars 11 and 12. More particularly, the bottom portion 26 is an elongated offset center bar which is attached at one end to the axle 23 (see FIG. 3) and which at the other end curves inwardly (FIG. 2) and is attached to the cross bar 13 (FIG. 3). V-shaped metal hanger straps 27 are attached to the center bar 26 and at their extremities to the chassis support bars 11 and 12. The hanger straps 27 and center bar 26 define a V-shaped center channel which is useful for hauling heavy cylindrical objects.

With the exception of the rubber tires, the hauler unit is constructed entirely of metal materials such as steel or aluminum. The attaching of metal parts is accomplished by welding them to one another.

The hauler unit also includes a handle member 28 which can be removably mounted at the second (upper) end of the chassis 10 when the hauler unit is used as an upright-type hand dolly. Handle member 28 is of a one-piece U-shaped construction and is inserted into the main longitudinal support bars 11 and 12, such support bars 11 and 12 being of a hollow tubular construction. The length of handle 28 can be adjusted by adjusting the depth to which it is inserted into the support bars 11 and 12. A set of adjustment holes are drilled through each leg of the handle member 28 and a single adjustment hole is drilled through each of support bars 11 and 12. Positioning bolts 29 are inserted through the support bar holes and selected handle member holes to secure a selected length for the handle member 28. The length is selected to provide the desired leverage.

Figure 4:
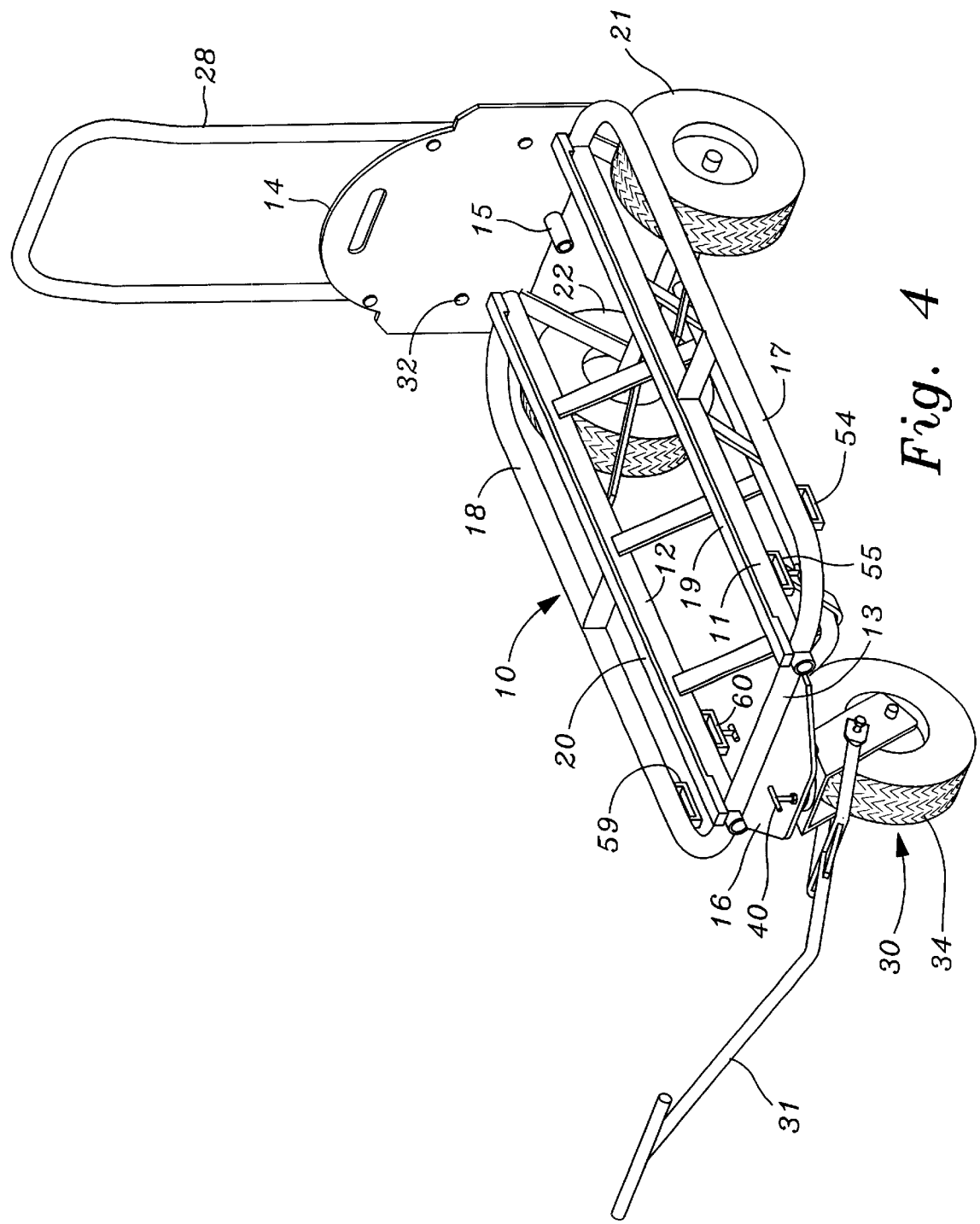
FIG. 4 is a perspective view showing the hauler unit in a horizontal-type cart configuration.

Referring now to FIG. 4, there is shown a perspective view of the hauler unit in a horizontal-type cart configuration. In this configuration, the hauler unit includes a third-wheel wheel assembly 30 which is removably mounted in the center of chassis 10 at the second end (cross bar 13 end) of chassis 10. The wheel assembly 30 is located on the second (lower) side of chassis 10, the same as are wheels 21 and 22. An optional pull tung 31 is connected to the wheel assembly 30 for enabling the user to pull and guide the "cart" of FIG. 4.

In the FIG. 4 configuration, the handle member 28 is removed from its former position at the cross bar 13 end of the chassis 10 and is instead removably mounted on the spade plate 14 at the other end of chassis 10. This mounting is accomplished by means of bolts 32 and cooperating wing nuts 33 located behind spade plate 14, such bolts passing through appropriate holes in spade plate 14. In this spade plate location, handle member 28 is in a vertical position and can be used by the user to push or pull the hauler unit.

Figure 5:
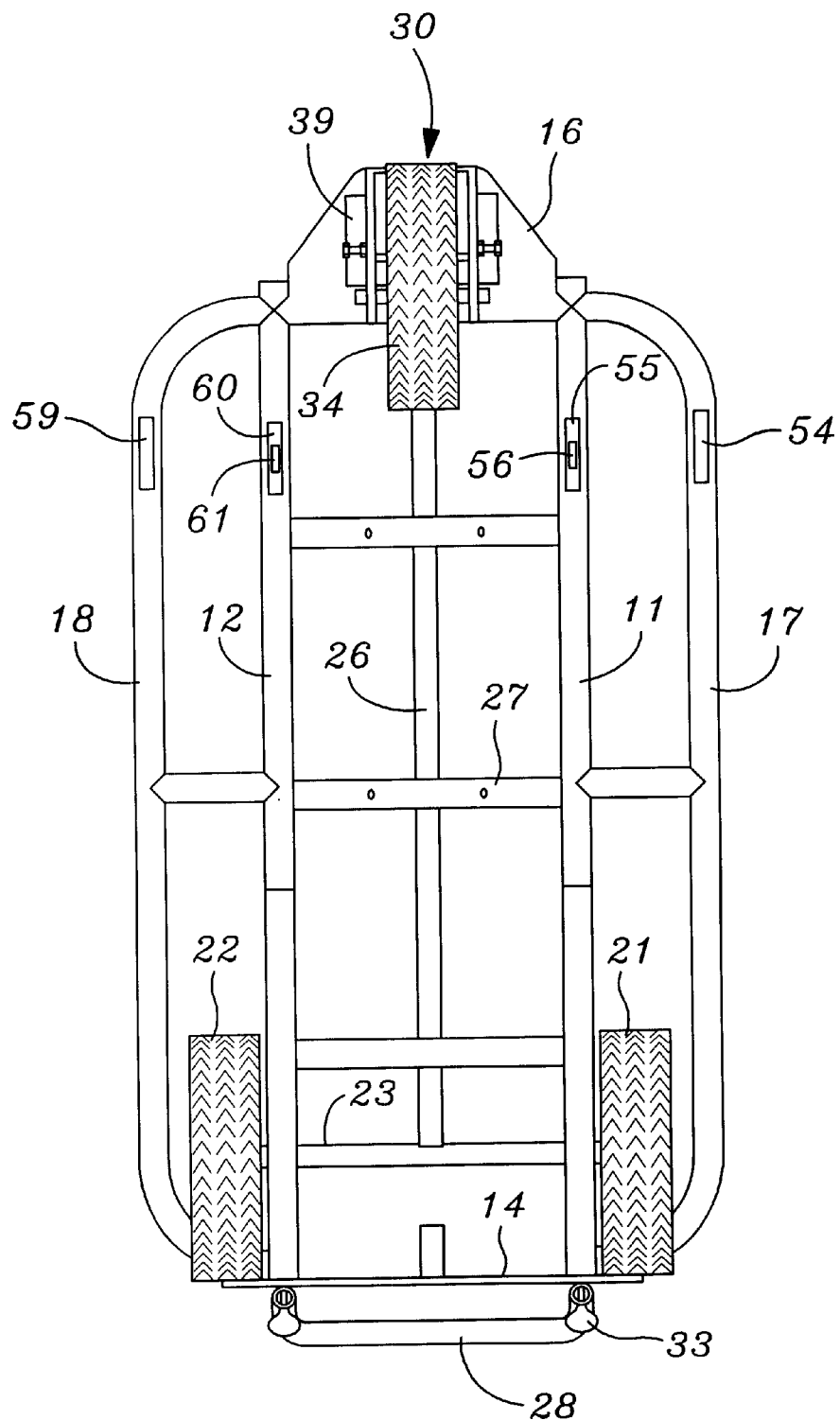
FIG. 5 is a bottom view of the FIG. 4 configuration.

FIG. 5 is a bottom view of the FIG. 4 configuration.

Figure 6A:
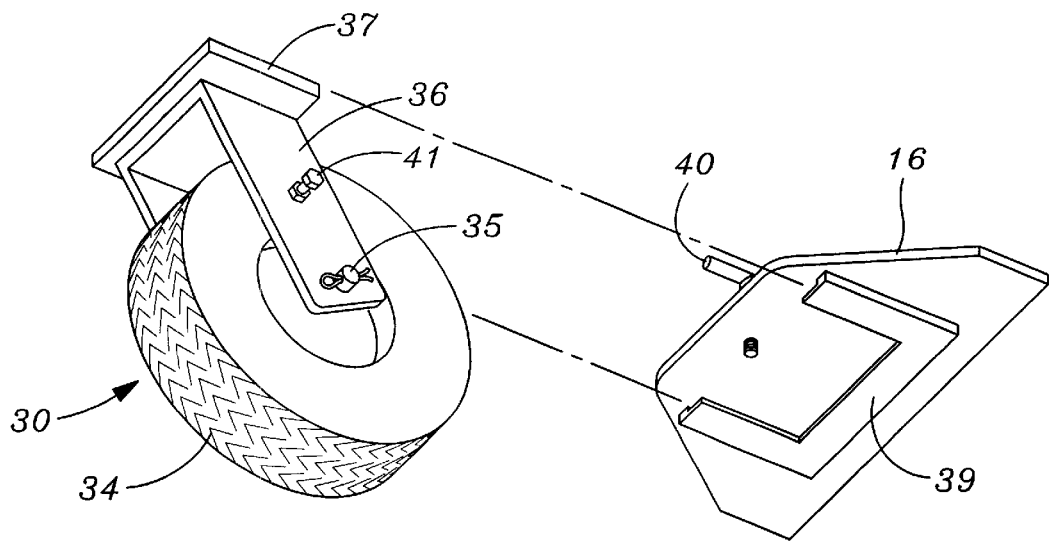
FIGS. 6A and 6B are enlarged views showing in greater detail how the third wheel of FIGS. 4 and 5 is removably mounted on the hauler unit chassis.
Figure 6B:
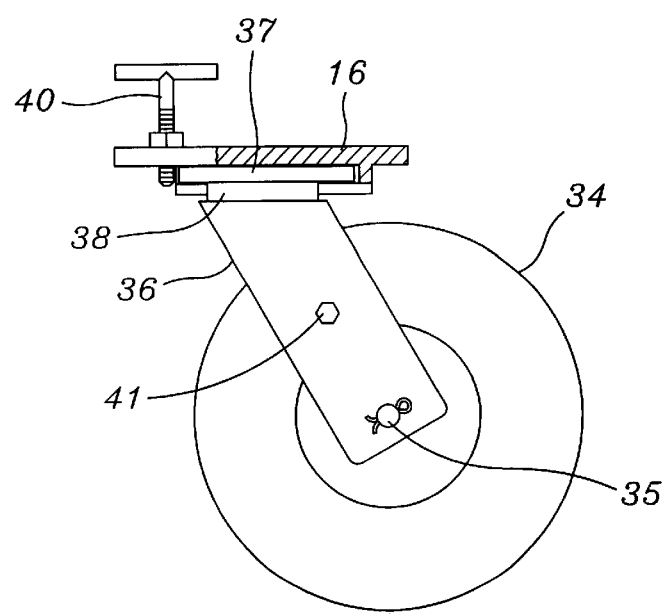

FIGS. 6A and 6B are enlarged views showing in greater detail the construction of the wheel assembly 30 of FIG. 4 and its manner of attachment to the chassis 10. As indicated in FIG. 6A, the wheel assembly 30 includes a third wheel 34 which is mounted in the center of chassis 10 at the second end of chassis 10 when the hauler unit is used as a horizontal cart. The third wheel 34 is mounted on an axle 35 which is supported by a downwardly extending wheel bracket 36. Bracket 36 is swivel-mounted on a mounting plate 37. A ball bearing assembly 38 is located intermediate the wheel bracket 36 and the mounting plate 37 so that bracket 36 and wheel 34 can readily swivel around the point of attachment to the mounting plate 37. As indicated in FIG. 6A, the third wheel 34 is connected to the underside of chassis 10 by sliding the mounting plate 37 into a slide-in retainer bracket 39 attached to the underside of the chassis support plate 16. A threaded retainer bolt 40 is then screwed down to lock the mounting plate 37 in the retainer bracket 39. Attachment bolts 41 are provided on the outer sides of the wheel bracket 36 for use in attaching the pull tung 31.

Referring now to FIG. 7, there is shown a perspective view showing the hauler unit in a modified horizontal configuration which is particularly useful for hauling loose material such as soil, sand, gravel and the like. In particular, a pair of elongated metal panels 42 and 43 are set into the V-shaped center channel at opposing angles to provide an angular cargo area for the loose material. A V-shaped riser plate 44 is set into the center channel adjacent and parallel to the spade plate 14 to provide an end closure wall for the angular cargo area. Riser plate 44 is shaped to match the V shape of the cargo area. Riser plate 44 is provided with a set of short tubular support legs 45 which are attached to the back side of the riser plate 44. In use, these support legs 45 rest on and bear against the spade plate 14 and enable the riser plate 44 to function as a raised spade plate when the hauler unit is used in an upright configuration (see FIG. 8). A lower one of these tubular support legs 45 is adapted to fit over the connector stub 15 on the spade plate 14 (see FIG. 4) for alignment and support purposes. If desired, a wall plate shaped like riser plate 44 may be used at the other end (the cross bar 13 end) of the hauler unit to provide an end closure wall for the other end of the cargo area.

Hand holes 46 are provided in side panel 42 and hand holes 47 are provided in side panel 43 for enabling the user to more easily manipulate these panels 42 and 43. In order to quickly unload loose material being hauled, one of these panels 42 and 43 may be pulled partly out of its cargo carrying position.

Figures 8, 9:
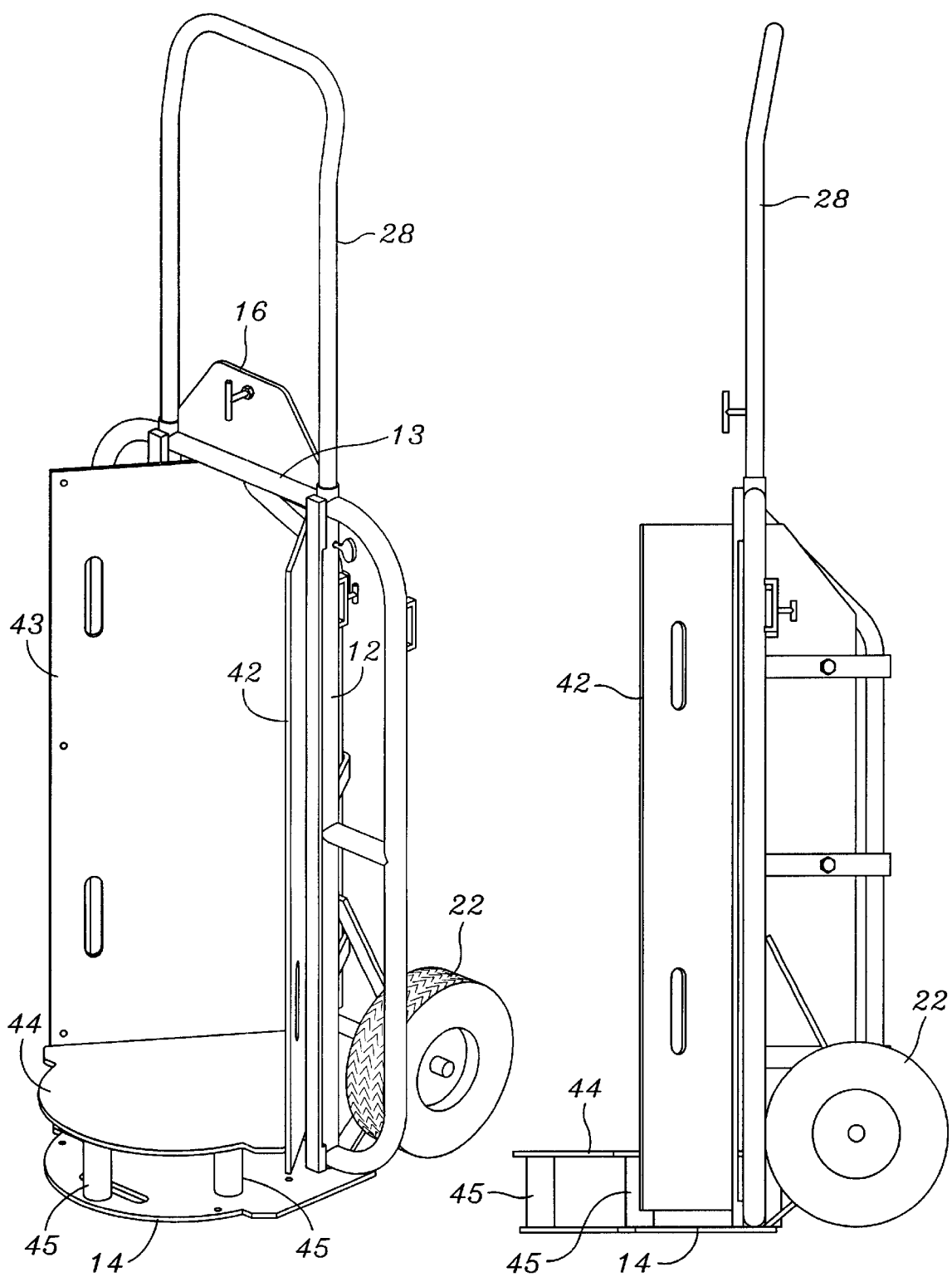
FIG. 8 is a perspective view showing the hauler unit in a modified upright hand dolly configuration which is particularly useful for hauling relatively large and heavy cylindrical objects.
FIG. 9 is a side view of the FIG. 8 configuration.

Referring now to FIGS. 8 and 9, the hauler unit is shown in an upright hand dolly configuration which is particularly useful for hauling relatively large and heavy cylindrical objects. This configuration is similar to the FIG. 7 configuration but with the third wheel 34 and pull tung 31 removed and with the unit placed in a vertical position with the spade plate 14 resting on the ground. Also, the handle member 28 is removed from the spade plate 14 and is instead mounted at the cross bar 13 end of the unit by inserting its legs into the tubular primary support bars 11 and 12. As such, the handle member 28 extends in the longitudinal direction of the hauler unit. FIG. 9 is a side view of FIG. 8. This configuration of FIGS. 8 and 9 is useful for hauling cylindrical objects such as, for example, kegs of beer, water cooler type bottles of bottled water, large oxygen cylinders, acetylene gas cylinders, and the like. The angular side panels 42 and 43 prevent the cylindrical object from rolling off of the dolly.

Figure 10:
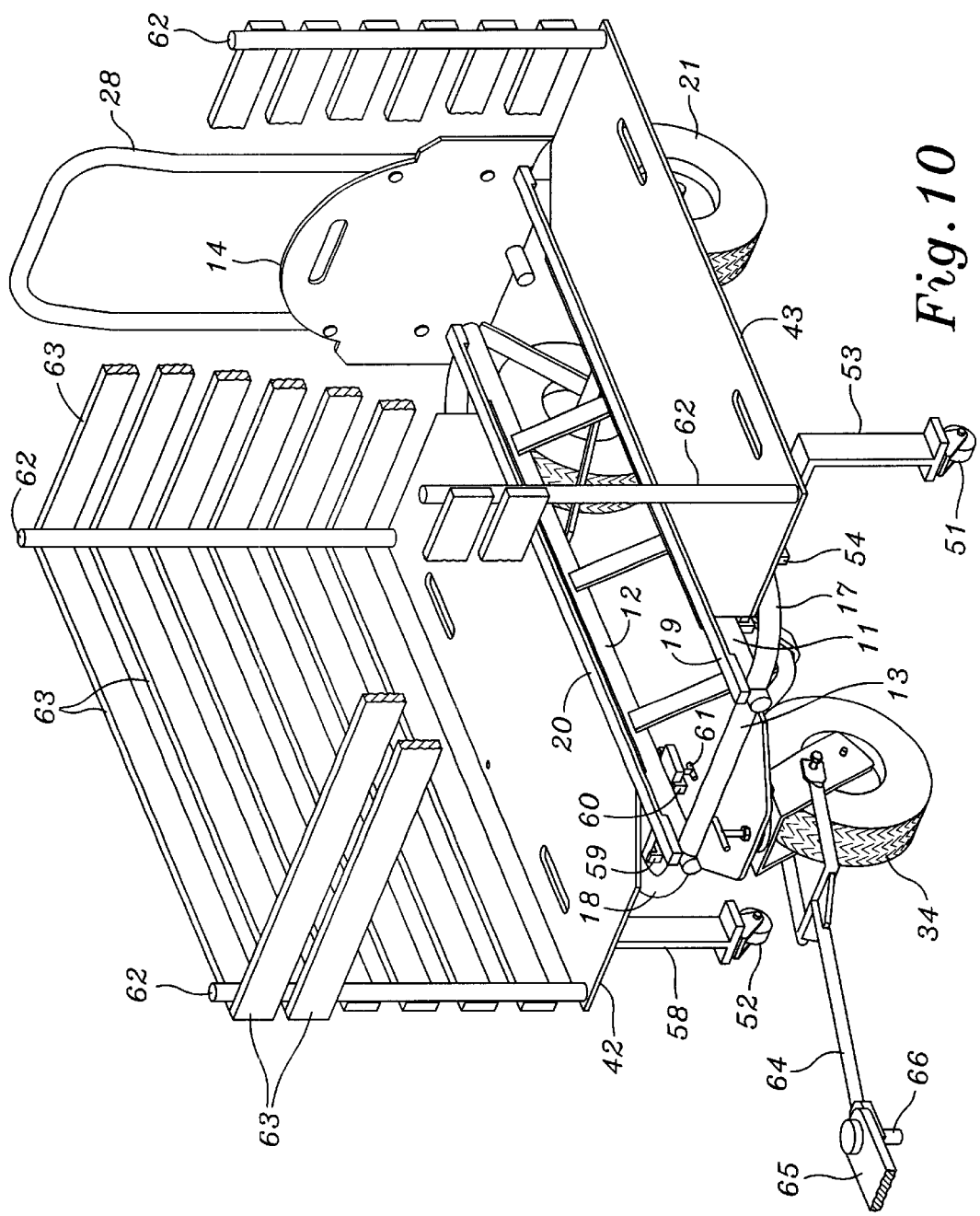
FIG. 10 is a perspective view showing the hauler unit in a horizontal configuration with added features including an enlarged cargo carrying area, outrigger wheels for anti-topple protection and side panels for increasing the load-carrying volume.

Referring now to FIG. 10, the hauler unit is shown in a horizontal configuration with several added features. In particular, an enlarged cargo carrying area is provided by placing the elongated panels 42 and 43 in horizontal positions on the chassis 10. The elongated panel 42 is inserted between the primary horizontal support bar 12 and its elongated strap member 20 and is allowed to rest on the support bar 12 and its associated side rail 18. The other elongated panel 43 is inserted between the other primary support bar 11 and its elongated strap member 19 and is allowed to rest on the support bar 11 and its associated side rail 17. The metal strap members 19 and 20 function as retainer mechanisms for retaining the elongated panels 42 and 43 in place. The extent to which the panels 42 and 43 are inserted can be varied to suit the desired size for the cargo carrying area.

For the hauler unit configuration shown in FIG. 10, the wheel assembly located at the forward end of the unit is modified to include not only the third wheel 34 but also a pair of outrigger wheels 51 and 52 which are removably attached to the right and left sides, respectively, of the chassis 10. Outrigger wheel 51 is swivel mounted at the bottom end of an L-shaped support member 53, the upper arm of which is inserted into brackets 54 and 55 attached to the undersides of side rail 17 and support bar 11, respectively. A clamping bolt 56 is provided on the bracket 55 for clamping the L-shaped support member 53 in place. The other outrigger wheel 52 is swivel mounted at the lower end of a second L-shaped support member 58, the upper arm of which is inserted into brackets 59 and 60 attached to the undersides of side rail 18 and support bar 12, respectively. A clamping bolt 61 is provided on the bracket 60 for clamping the L-shaped support member 58 in place. Brackets 54, 55, 59 and 60 are best seen in FIGS. 4 and 5. Outrigger wheels 51 and 52 provide anti-topple protection for the cargo being hauled.

The hauler unit of FIG. 10 further includes vertically extending side panels for increasing the load-carrying volume of the hauler. This side panel construction is provided by four vertical corner posts 62 mounted at the four outer corners of the horizontal cargo panels 42 and 43. Side walls are formed by the use of horizontally extending wall slats 63 which are attached to and extend between the corner posts 62.

A modified pull tung is used in FIG. 10. In particular, a pull tung 64 is provided which is adapted to be connected to the trailer hitch 65 of a motorized tractor unit such as a small garden tractor. A hitch pin 66 connects the pull tung 64 to the hitch 65.

Figure 11:
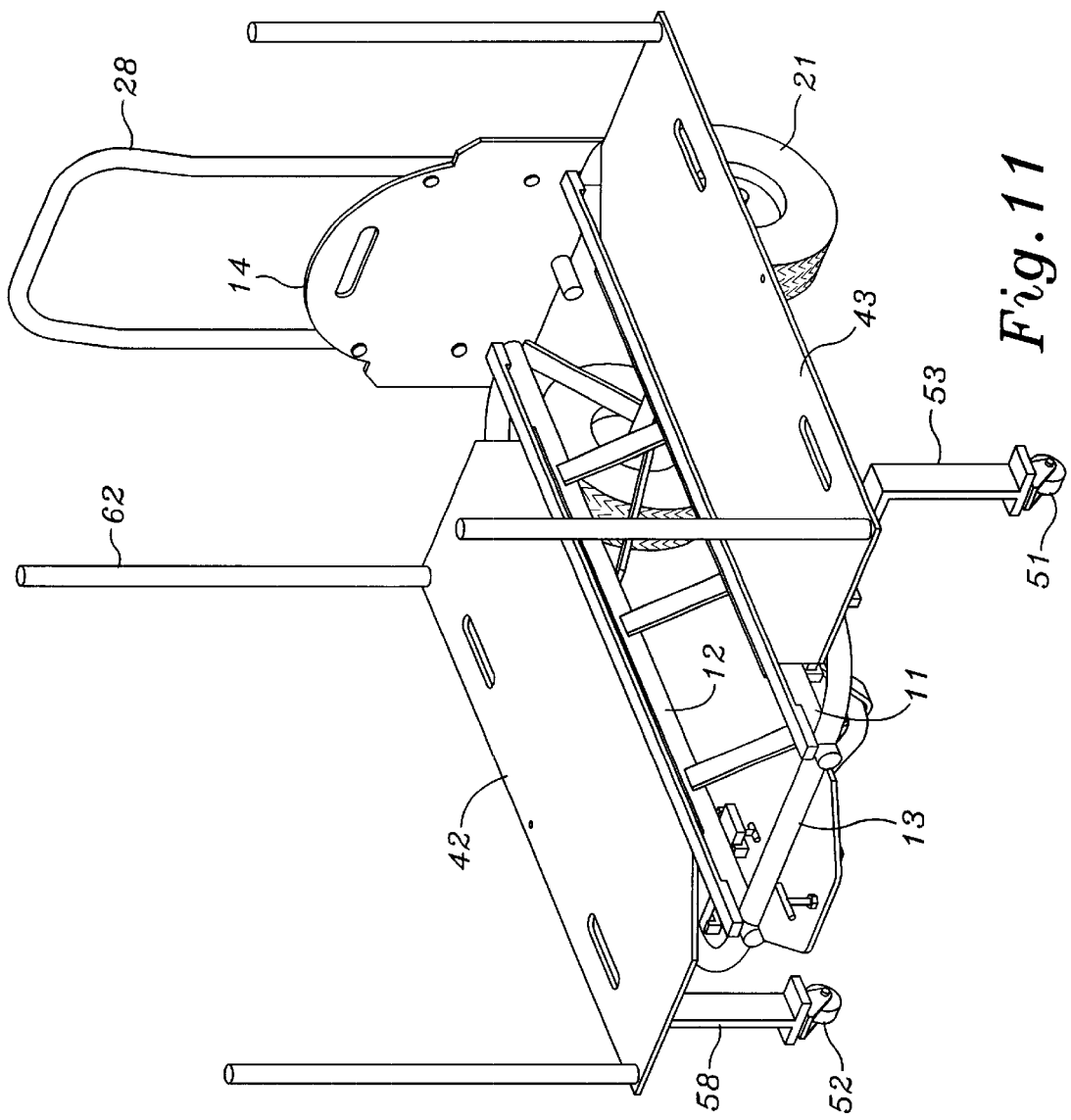
FIG. 11 is a perspective view of a horizontal configuration similar to FIG. 10 but showing only the use of the outrigger wheels as the forward wheel assembly.

Referring now to FIG. 11, there is shown a horizontal configuration similar to that of FIG. 10 but with the third wheel 34 removed and not used. Only the outrigger wheels 51 and 52 are used for the forward wheel assembly. This version will provide satisfactory performance for some applications, particularly those where the hauler unit is used on a hard surface.

Figure 12:
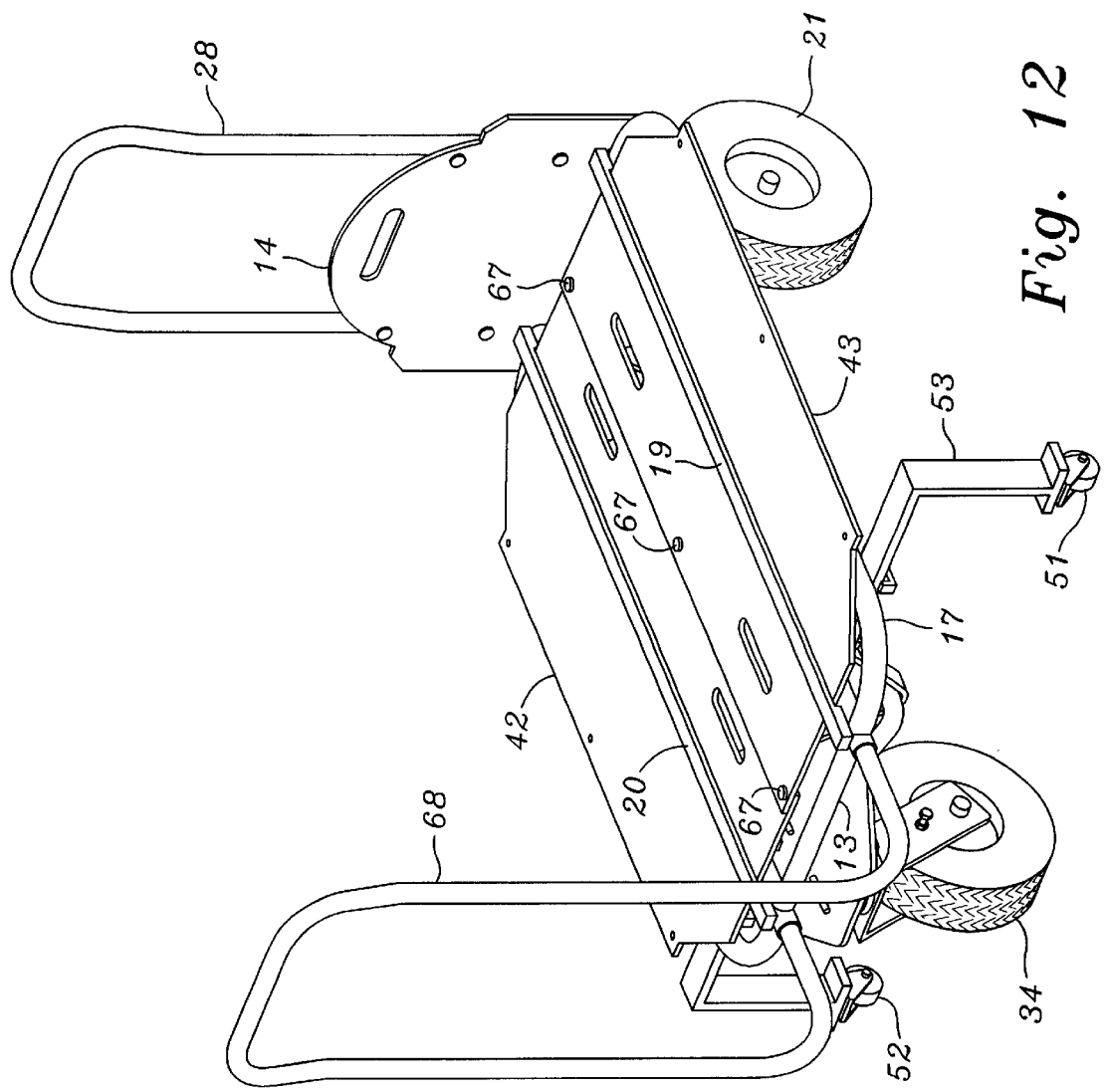
FIG. 12 is a perspective view showing the hauler unit in a modified horizontal configuration wherein the flat cargo-carrying panels are shoved together and bolted together in an overlapping manner and further showing the use of a second handle member mounted at the forward end of the hauler chassis.
Figure 13:
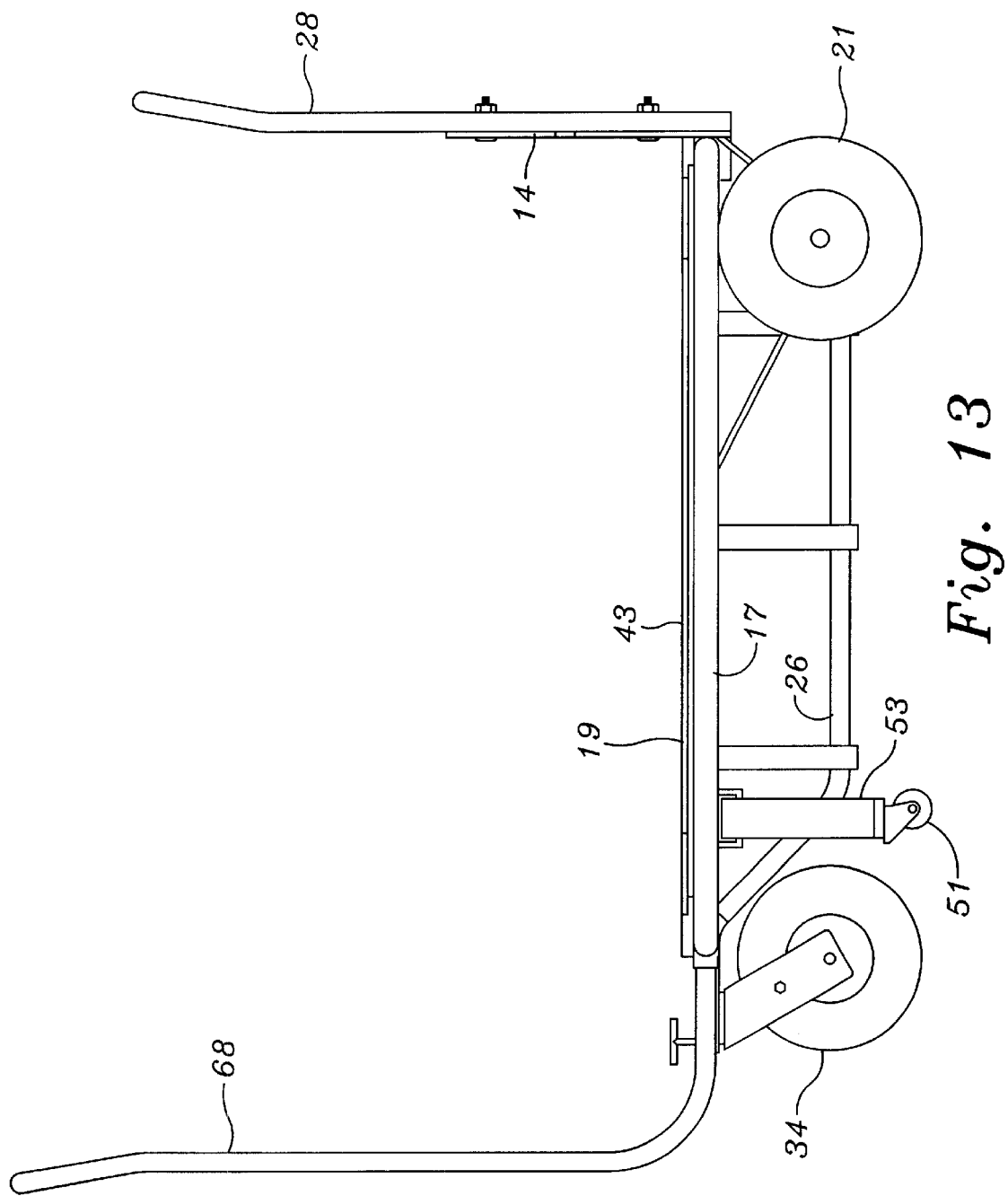
FIG. 13 is a side view of the hauler unit configuration of FIG. 12.

Referring now to FIGS. 12 and 13, the hauler unit is shown in a further modified horizontal embodiment. In this embodiment, the horizontal cargo-carrying panels are shoved together so as to overlap a small amount. The overlapping portions are bolted together by a series of bolts 67 having cooperating nuts threaded onto the other ends thereof. This embodiment also includes a second handle member 68 which is removably mounted at the cross bar 13 end of the chassis 10 by inserting the bottom arms of the handle member into the tubular primary support bars 11 and 12 of the chassis 10. This second handle member 68 is locked in place by bolts 29 (shown in FIGS. 1 and 3) inserted through holes in support bars 11 and 12 and cooperating holes drilled through the bottom arms of handle member 68. When both handle members 28 and 68 are used, the hauler unit may be pushed or pulled from either end.

While there have been described what are at present considered to be preferred embodiments of this invention, it will be obvious to those skilled in the art that various changes and modifications may be made therein without departing from the invention and it is, therefore, intended to cover all such changes and modifications as come within the true spirit and scope of the invention.

What is claimed is:

1. A heavy-duty all-terrain convertible hand dolly and cart combination comprising:
   an elongated chassis having first and second ends and first and second sides;
   a load-support spade attached to the first end of the chassis and extending outwardly from the first side thereof;
   a pair of relatively large diameter rubber-tired wheels mounted near the first end of the chassis on the second side thereof;
   and a wheel assembly mounted on the chassis near the second end of the chassis on the second side thereof when the combination is used as a horizontal cart, such wheel assembly comprising a single relatively large diameter rubber-tired wheel and a swivel mechanism for positioning the single wheel at a transversely central location near the second end of the chassis, the swivel mechanism enabling the single wheel to swivel with respect to the chassis.

2. The combination of claim 1 wherein:
   the elongated chassis includes an elongated V-shaped center channel having a channel bottom center member located several inches below the second side of the chassis;
   and the combination includes a pair of elongated panels set into the center channel at approximately a ninety-degree angle relative to one another to provide an angular cargo area.

3. The combination of claim 1 wherein the wheel assembly includes:
   a wheel bracket supporting the single wheel;
   a wheel mounting plate;

a ball bearing assembly connecting the wheel bracket to the wheel mounting plate;

an opened-ended C-shaped retainer bracket attached to the underside of the chassis in a transversely central location at the second end of the chassis for slidably receiving the wheel mounting plate when the combination is used as a horizontal cart;

and an adjustable retainer member for retaining the wheel mounting plate in the C-shaped retainer bracket during use.

4. A heavy-duty all-terrain convertible hand dolly and cart combination comprising:

an elongated chassis having first and second ends, first and second sides and an elongated V-shaped center channel having a channel bottom center member located several inches below the second side of the chassis;

a load-support spade attached to the first end of the chassis and extending outwardly from the first side thereof;

a pair of relatively large diameter rubber-tired wheels mounted near the first end of the chassis on the second side thereof;

a wheel assembly mounted on the chassis near the second end of the chassis on the second side thereof when the combination is used as a horizontal cart, such wheel assembly comprising a single relatively large diameter rubber-tired wheel and a swivel mechanism for positioning the single wheel at a transversely central location near the second end of the chassis, the swivel mechanism enabling the single wheel to swivel with respect to the chassis;

a pair of elongated panels set into the V-shaped center channel at approximately a ninety-degree angle relative to one another to provide an angular cargo area;

and a riser plate assembly having a V-shaped plate member set into the V-shaped center channel parallel to and near the load-support spade and a plurality of support legs attached to the V-shaped plate member for engaging the load-support spade to enable the V-shaped plate member to function as a raised load-support spade.

5. A convertible hand dolly and cart combination comprising:

an elongated chassis having first and second longitudinal support bars, a cross member attached between the support bars at one end of the chassis and a transverse spade plate attached between the support bars at the other end of the chassis and extending outwardly on a first side of the chassis;

a transverse axle member attached to the chassis near the spade plate end of the chassis on a second side of the chassis;

a pair of wheels individually mounted on opposite ends of the axle member;

a single wheel mounted on the chassis midway between the first and second longitudinal support bars at the cross member end of the chassis on the second side of the chassis when the combination is used as a horizontal cart;

a longitudinal side rail offset from, running along side of and attached to the first longitudinal support bar;

a relatively rigid longitudinal metal retainer member attached at both ends to the load-bearing side of the first longitudinal support bar;

and an elongated panel inserted between the first support bar and the metal retainer member and supported by the first support bar and the side rail to provide a horizontal cargo carrying surface when the combination is used as a horizontal cart.

6. A convertible hand dolly and cart combination comprising:

an elongated chassis having first and second longitudinal support bars, a cross member attached between the support bars at one end of the chassis and a transverse spade plate attached between the support bars at the other end of the chassis and extending outwardly on a first side of the chassis;

a transverse axle member attached to the chassis near the spade plate end of the chassis on a second side of the chassis;

a pair of wheels individually mounted on opposite ends of the axle member;

a single wheel mounted on the chassis midway between the first and second longitudinal support bars at the cross member end of the chassis on the second side of the chassis when the combination is used as a horizontal cart;

a first longitudinal side rail offset from, running along side of and attached to the first longitudinal support bar;

a first relatively rigid longitudinal metal retainer member attached at both ends to the load-bearing side of the first longitudinal support bar;

a first elongated panel inserted between the first support bar and the first metal retainer member and supported by the first support bar and the first side rail to provide a horizontal cargo carrying surface when the combination is used as a horizontal cart;

a second longitudinal side rail offset from, running along side of and attached to the second longitudinal support bar;

a second relatively rigid longitudinal metal retainer member attached at both ends to the load-bearing side of the second longitudinal support bar;

and a second elongated panel inserted between the second support bar and the second metal retainer member and supported by the second support bar and the second side rail to provide an additional horizontal cargo carrying surface when the combination is used as a horizontal cart.

7. The combination of claim 6 wherein the single wheel mounted midway between the first and second longitudinal support bars is a relatively large diameter rubber-tired wheel for negotiating rough terrain and the combination includes:

a wheel bracket supporting the single wheel;

a wheel mounting plate;

a ball bearing assembly connecting the wheel bracket to the wheel mounting plate;

an open-ended C-shaped retainer bracket attached to the underside of the chassis midway between the first and second longitudinal support bars at the cross member end of the chassis for slidably receiving the wheel mounting plate when the combination is used as a horizontal cart;

and an adjustable retainer member for retaining the wheel mounting plate in the C-shaped retainer bracket during use.

8. A heavy-duty all-terrain convertible hand dolly and cart combination comprising:

an elongated chassis having first and second ends, first and second sides and an elongated V-shaped center channel having a channel bottom center member located several inches below the second side of the chassis;

a load-support spade attached to the first end of the chassis and extending outwardly from the first side thereof;

a pair of relatively large diameter rubber-tired wheels mounted near the first end of the chassis on the second side thereof;

a wheel assembly mounted on the chassis near the second end of the chassis on the second side thereof when the combination is used as a horizontal cart, such wheel assembly comprising a single relatively large diameter rubber-tired wheel and a swivel mechanism for positioning the single wheel at a transversely central location near the second end of the chassis, the swivel mechanism enabling the single wheel to swivel with respect to the chassis;

and a riser plate assembly having a V-shaped plate member set into the V-shaped center channel parallel to and near the load-support spade and a plurality of support legs attached to the V-shaped plate member for engaging the load-support spade to enable the V-shaped plate member to function as a raised load-support spade.

* * * * *